United States Patent
Weng et al.

(10) Patent No.: US 9,842,443 B1
(45) Date of Patent: Dec. 12, 2017

(54) COMPUTING DEVICE AS A VEHICLE KEY

(71) Applicant: Google Inc., Mountain View, CA (US)

(72) Inventors: Zhi Weng, San Jose, CA (US); Lantian Zheng, San Jose, CA (US)

(73) Assignee: Google LLC, Mountain View, CA (US)

( * ) Notice: Subject to any disclaimer, the term of this patent is extended or adjusted under 35 U.S.C. 154(b) by 11 days.

(21) Appl. No.: 14/878,731

(22) Filed: Oct. 8, 2015

Related U.S. Application Data

(62) Division of application No. 13/442,618, filed on Apr. 9, 2012, now Pat. No. 9,162,648.

(51) Int. Cl.
G07C 9/00 (2006.01)
B60R 25/04 (2013.01)
B60R 25/24 (2013.01)
B60R 25/20 (2013.01)
H04L 7/00 (2006.01)

(52) U.S. Cl.
CPC .......... *G07C 9/00182* (2013.01); *B60R 25/04* (2013.01); *B60R 25/209* (2013.01); *B60R 25/241* (2013.01); *G07C 9/00896* (2013.01); *H04L 7/0041* (2013.01); *B60R 2025/0405* (2013.01); *G07C 2009/0023* (2013.01); *G07C 2009/0096* (2013.01)

(58) Field of Classification Search
CPC ............ G07C 9/00182; G07C 9/00896; G07C 2009/0096; G07C 2009/0023; B60R 25/04; B60R 25/209; B60R 25/241; B60R 2025/0405; H04L 7/041
See application file for complete search history.

(56) References Cited

U.S. PATENT DOCUMENTS

| 8,736,438 B1 | 5/2014 | Vasquez et al. |
| 9,317,241 B2 * | 4/2016 | Tranchina ............. G06F 3/1423 |
| 2005/0258936 A1 * | 11/2005 | Ghabra ................. B60R 25/245 340/5.72 |

(Continued)

OTHER PUBLICATIONS

NXP, "NXP Unlocks the Potential of Multifunction Car Keys," NXP Semiconductors, retrieved from http://www.nxp.com/news/press-releases/2011/06/nxp-unlocks-the-potential-of-multifunction-car-keys.html, Jun. 22, 2011, 2 pp.

(Continued)

*Primary Examiner* — Khoi Tran
*Assistant Examiner* — Robert Nguyen
(74) *Attorney, Agent, or Firm* — Shumaker & Sieffert, P.A.

(57) ABSTRACT

In general, aspects of this disclosure are directed towards techniques for using a computing device to perform the functionality of a vehicle key, so that the computing device may be used to automatically unlock the doors of a vehicle and/or to activate a previously-deactivated keyless ignition system. The computing device may be associated with a vehicle, including sending an identifier associated with the computing device to the vehicle via short-range communication. The computing device may also send to the vehicle, via short-range communication, at least one unlock door signal including an access code verifiable by the vehicle, and wherein receipt of the at least one unlock door signal by the vehicle enables the vehicle to unlock one or more of its doors without further user intervention.

20 Claims, 7 Drawing Sheets

(56) References Cited

U.S. PATENT DOCUMENTS

| | | | |
|---|---|---|---|
| 2005/0285724 A1* | 12/2005 | Schmidt | B60R 25/04 340/426.16 |
| 2006/0114100 A1* | 6/2006 | Ghabra | E05B 81/78 340/5.61 |
| 2008/0117079 A1* | 5/2008 | Hassan | B60R 25/045 340/901 |
| 2009/0096575 A1 | 4/2009 | Tieman | |
| 2010/0207722 A1 | 8/2010 | Rutledge | |
| 2011/0063076 A1 | 3/2011 | Kurtz et al. | |
| 2011/0086668 A1 | 4/2011 | Patel | |
| 2011/0112969 A1* | 5/2011 | Zaid | G06Q 10/02 705/50 |
| 2011/0148574 A1 | 6/2011 | Simon et al. | |
| 2011/0177780 A1 | 7/2011 | Sato et al. | |
| 2011/0210830 A1 | 9/2011 | Talty et al. | |
| 2011/0215901 A1 | 9/2011 | Van Wiemeersch et al. | |
| 2011/0215921 A1 | 9/2011 | Ayed et al. | |
| 2011/0257817 A1 | 10/2011 | Tieman | |
| 2011/0294490 A1 | 12/2011 | Faenger | |
| 2011/0301839 A1 | 12/2011 | Pudar et al. | |
| 2012/0019379 A1 | 1/2012 | Ayed | |
| 2012/0066756 A1 | 3/2012 | Vysogorets | |
| 2012/0092129 A1* | 4/2012 | Lickfelt | B60R 25/24 340/5.72 |
| 2012/0115446 A1* | 5/2012 | Gautama | G08C 17/02 455/414.1 |
| 2012/0130604 A1 | 5/2012 | Kirshon | |
| 2012/0197484 A1 | 8/2012 | Nath et al. | |
| 2012/0223810 A1 | 9/2012 | Petrucci et al. | |
| 2012/0254960 A1* | 10/2012 | Lortz | H04L 63/104 726/7 |
| 2012/0271486 A1 | 10/2012 | McDonald, II et al. | |
| 2012/0280805 A1 | 11/2012 | Magner et al. | |
| 2013/0012123 A1 | 1/2013 | DeLuca | |
| 2013/0082820 A1 | 4/2013 | Tieman | |
| 2013/0111581 A1 | 5/2013 | Griffin | |
| 2013/0259232 A1* | 10/2013 | Petel | H04L 63/0492 380/270 |
| 2014/0058586 A1 | 2/2014 | Kalhous et al. | |
| 2014/0142783 A1 | 5/2014 | Grimm et al. | |
| 2014/0248863 A1 | 9/2014 | Golsch | |

OTHER PUBLICATIONS

Ricker, "BMW's NFC Key is your ticket to ride, and you should care (video)," Transportation, Wireless, retrieved at http://www.engadget.com/2011/02/02/bmws-nfc-key-is-your-ticket-to-ride-and-you-should-care-video/, Feb. 2, 2011, 6 pp.

O'Connor, "RFID Is Key to Car Clubs' Success," RFID Journal, retrieved at http://www.rfidjournal.com/article/view/3839/1, Jan. 7, 2008, 4 pp.

Haller et al., "The S/KEY One-Time Password System," Network Working Group, RFC: 1760, Feb. 1995, 12 pp.

Haller et al., "A One-Time Password System," Network Working Group, RFC: 2289, Feb. 1998, 26 pp.

M'Raihi et al., "HOTP: An HMAC-Based One-Time Password Algorithm," Network Working Group, RFC: 4226, Dec. 2005, 35 pp.

Prosecution History from U.S. Appl. No. 13/442,618, from Oct. 23, 2014 through Jun. 17, 2015 44 pp.

Prosecution History from U.S. Appl. No. 13/745,528, from May 23, 2013 through Mar. 26, 2014 47 pp.

\* cited by examiner

COMPUTING DEVICE AS A VEHICLE KEY

This application is a divisional of U.S. application Ser. No. 13/442,618 filed Apr. 9, 2012, which is incorporated by reference herein in its entirety.

TECHNICAL FIELD

The disclosure generally relates to a computing device that communicates with a vehicle.

BACKGROUND

Typically, a vehicle equipped with a smart vehicle key system may be able to unlock its doors or to activate its ignition system upon detecting a smart vehicle key associated with the vehicle. A user may be able to leave her smart vehicle key in her pockets or in her bag while still being able to unlock doors on her vehicle or to start her vehicle.

SUMMARY

In one aspect, the disclosure is directed to a method. The method may include associating a computing device and a vehicle including sending, by the computing device, an identifier associated with the computing device to the vehicle via short-range communication. The method may further include sending, from the computing device to the vehicle via short-range communication, at least one unlock door signal including an access code that is verifiable by the vehicle, and wherein receipt of the at least one unlock door signal by the vehicle enables the vehicle to unlock one or more of its doors without further user intervention.

In another aspect, the disclosure is directed to a mobile telephone device. The computing device may include one or more processors. The computing device may further include a touch-sensitive display. The computing device may also include a short-range communication module configured to send to a vehicle via short-range communication at least one unlock door signal including an access code that is verifiable by the vehicle, and wherein receipt of the at least one unlock door signal by the vehicle enables the vehicle to unlock one or more of its doors without further user intervention. The computing device may also include an authentication module being executed on the one or more processors and configured to authenticate a user based at least in part on one or more gestures detected at the touch-sensitive display and to authorize the short-range communication module to send the at least one ignition signal based at least in part on successful authentication of the user.

In another aspect, the disclosure is directed to a computer-readable medium containing instructions that, when executed on at least one programmable processor, cause the at least one programmable processor to perform operations. The operations may include associating a computing device with a vehicle including sending an identifier associated with the computing device to the vehicle via near field communication (NFC). The operations may further include sending, from the computing device to the vehicle via NFC, at least one ignition signal including an access code that is verifiable by the vehicle, and wherein receipt of the at least one ignition signal by the vehicle enables the vehicle to enable a keyless ignition system of the vehicle.

In another aspect, the disclosure is directed to a vehicle control system for a vehicle. The vehicle control system may include one or more processors. The vehicle control system may further include a communication module operable on the one or more processors and configured to: communicate with a mobile computing device; receive an identifier associated with the mobile computing device; and receive at least one unlocking signal from the mobile computing device, the at least one unlocking signal including an access code that is verifiable by the vehicle control system. The vehicle control system may further include an association module operable on the one or more processors and configured to, after the communication module receives the identifier associated with the mobile computing device, associate the mobile computing device with the vehicle. The vehicle control system may further include an unlocking module operable on the one or more processors and configured to, after the communication module receives at least one unlocking signal from the mobile computing device, direct an electronic control unit to unlock one or more doors of the vehicle.

In another aspect, the disclosure is directed to a method. The method may include communicating, by a vehicle control system of a vehicle, with a mobile computing device. The method may further include receiving, by the vehicle control system, an identifier associated with a mobile computing device. The method may further include receiving, by the vehicle control system, at least one unlocking signal from the mobile computing device, the at least one unlocking signal including an access code that is verifiable by the vehicle control system. The method may further include, after receiving the identifier associated with the mobile computing device, associating, by the vehicle control system, the mobile computing device with the vehicle. The method may further include, after receiving at least one unlocking signal from the mobile computing device, directing, by the vehicle control system, an electronic control unit to unlock one or more doors of the vehicle.

In another aspect, the disclosure is directed to a computer-readable storage medium containing instructions that, when executed on at least one programmable processor, cause the at least one programmable processor to perform operations. The operations may include communicating, by a vehicle control system of a vehicle, with a mobile computing device. The operations may further include receiving, by the vehicle control system, an identifier associated with a mobile computing device. The operations may further include receiving, by the vehicle control system, at least one unlocking signal from the mobile computing device, the at least one unlocking signal including an access code that is verifiable by the vehicle control system. The method may further include, after receiving the identifier associated with the mobile computing device, associating, by the vehicle control system, the mobile computing device with the vehicle. The method may further include, after receiving at least one unlocking signal from the mobile computing device, directing, by the vehicle control system, an electronic control unit to unlock one or more doors of the vehicle.

In another aspect, the disclosure is directed to a method. The method may include, at a mobile telephonic device, verifying that an authorized user is associated with the mobile telephonic device; communicating, by the mobile telephonic device and to a vehicle, information to mutually authenticate the mobile telephonic device and/or its authorized user and the vehicle, and sending by the mobile telephonic device via short-range communication to the vehicle, one or more commands. The commands may include one or more of a door-unlock command; an ignition command; and/or configuration information.

The details of one or more aspects of the disclosure are set forth in the accompanying drawings and the description

DETAILED DESCRIPTION

In general, aspects of this disclosure are directed towards techniques for using a computing device to perform the functionality of a vehicle key, so that the computing device may be used to automatically unlock the doors of a vehicle and/or to activate a previously deactivated keyless ignition system. The computing device and the vehicle may communicate via a wireless communication, e.g., short-range communication, such as near field communication (NFC), radio-frequency identification (RFID), infrared (IR) communication, Bluetooth, Wi-Fi Direct, and the like. The computing device may include a short-range communications module, such as an NFC module, RFID module, IR module, Bluetooth module, or Wi-Fi module, and the vehicle may include one or more short-range communication devices, such as one or more NFC devices, one or more RFID devices, one or more IR devices, one or more Bluetooth devices, or one or more Wi-Fi devices, that are placed throughout the vehicle. The vehicle may detect that the computing device is within proximity of the vehicle and may automatically perform one or more functions based on communications between the computing device and the vehicle.

The computing device may communicate with an associated vehicle to unlock one or more doors or to activate a previously deactivated keyless ignition system without further user intervention, and without a user having to dig her vehicle key out of her pockets or bag. Aspects of this disclosure have several advantages. For example, integrating a vehicle key with a computing device obviates the need to carry a separate vehicle key. Moreover, the computing device can include additional security features. For example, an authentication interface may be presented by the computing device to ensure that only authorized users are able to use the computing device as a vehicle key to control the vehicle.

Figure 1:
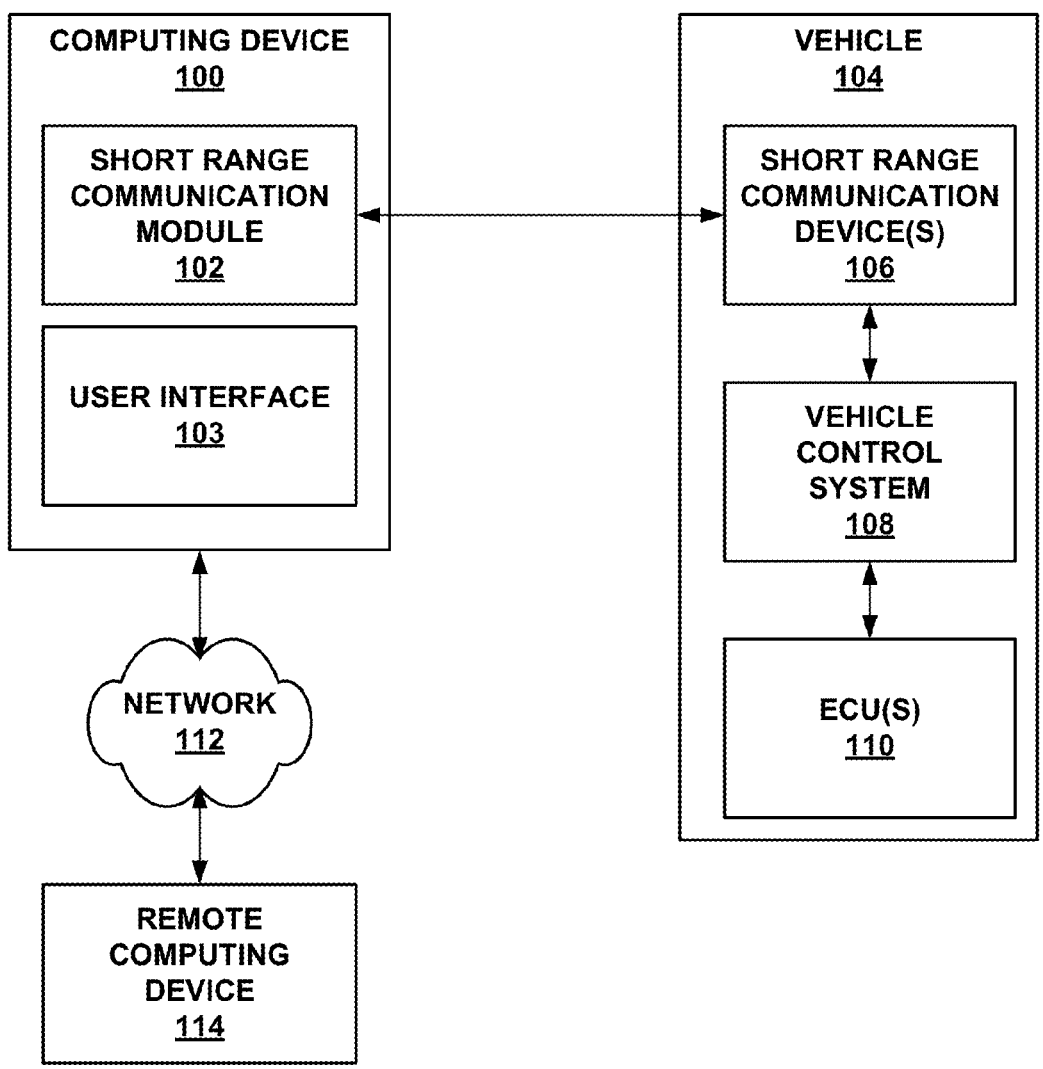
FIG. 1 is a block diagram illustrating an example computing device communicating with an example vehicle according to some aspects of the present disclosure.

FIG. 1 is a block diagram illustrating an example computing device communicating with an example vehicle. As shown in FIG. 1, a computing device 100 may include a short-range communication module 102, such as a near field communication (NFC) module, and a user interface 103, such as a touch-sensitive display. A vehicle 104 may include one or more short-range communication devices 106, such as NFC devices, a vehicle control system 108, and one or more electronic control units (ECUs) 110. The computing device 100 may act as a smart vehicle key to the vehicle by communicating with the vehicle 104, including sending at least one signal from the short-range communication module 102 to the one or more short-range communication devices 106 via short-range communication, such as NFC, to enable the vehicle 104 to perform one or more functions of the vehicle 104. A remote computing device 114 may communicate with the computing device 100 via network 112.

In response to receiving at least one signal from the short-range communication module 102 of the computing device 100, the one or more short-range communication devices 106 of the vehicle 104 may communicate with the vehicle control system 108 based at least in part on the at least one signal. In response, the vehicle control system 108 may communicate with the one or more ECUs 110 to perform one or more functions of the vehicle 104. The one or more functions of the vehicle 104 may, in some examples, include locking and unlocking one or more doors of the vehicle 104, or activating a previously deactivated keyless ignition system of the vehicle 104. In some examples, the functions of the vehicle 104 may include sending data back from the vehicle 104 to the computing device 100, including sending global positioning system (GPS) data or diagnostic data associated with the vehicle 104.

In some examples, the computing device 100 may be a mobile computing device, including but not limited to a mobile phone, a tablet computer, a personal digital assistant, a handheld computer, a media player, and the like, including a combination of two or more of these items. In some examples, the remote computing device 114 may include but is not limited to a general purpose computer, a server system, a mobile computing device, and the like. In some examples, the vehicle 104 may be a motor vehicle, such as an automobile (e.g., a car or a truck), a motorcycle or moped, an aircraft, a watercraft, an all-terrain vehicle, a tractor, and the like.

In some examples, the short-range communication module 102 and the one or more short-range communication devices 106 may include two different modes of operation to communicate with each other. For example, if the short-range communication module 102 is an NFC module and if the one or more short-range communication devices 106 are NFC devices, the short-range communication module 102 and the one or more short-range communication devices 106 may include an active mode and a passive mode of operation to communicate via NFC. In an active mode of operation, the short-range communication module 102 may generate a first radio field that is received by one or more of the one or more short-range communication devices 106 in physical proximity to the short-range communication module 102. In response, the one or more of the one or more short-range communication devices 106 may generate a second radio field that is received by the short-range communication module 102. In this way, data may be communicated between short-range communication module 102 and the one or more short-range communication devices 106, such as by using peer-to-peer communication.

In a passive mode of operation, load modulation techniques may be employed to facilitate data communication between the short-range communication module 102 and the one or more short-range communication devices 106. In a passive mode, the one or more short-range communication devices 106 may not generate a radio field in response to the radio field of the short-range communication module 102. Instead, the one or more short-range communication devices 106 may be electrical hardware (e.g., an NFC module) that generates a change in impedance in response to the radio field generated by the short-range communication module 102. For example, the short-range communication module 102 may generate a radio field that is received by the one or more short-range communication devices 106. Electrical hardware in the one or more short-range communication devices 106 may generate a change in impedance in response to the radio field. The change in impedance may be detected by the short-range communication module 102. In this way, load modulation techniques may be used by the short-range communication module 102 to communicate with the one or more short-range communication devices 106. In other words, the short-range communication module 102 may receive data from the one or more short-range communication devices 106, but the one or more short-range communication devices 106 may not receive any data from the short-range communication module 102 in the passive mode. Other well-known modulation techniques including phase modulation and/or amplitude modulation may also be employed to facilitate data communication between the short-range communication module 102 and the one or more short-range communication devices 106 in other examples.

Generally, the one or more short-range communication devices 106 may be a NFC module that operates in an active NFC mode. In other words, the one or more short-range communication devices 106 may include active NFC hardware. This active NFC hardware may be configured to emulate passive NFC hardware or participate in active near field communication. Although a user may physically touch, bump, or tap the computing device 100 to the one or more short-range communication devices 106, the short-range communication module 102 of the computing device 100 may be capable of communicating with the one or more short-range communication devices 106 without physically touching the one or more short-range communication devices 106.

In some examples, the vehicle control system 108 may be any combination of software, hardware, switches, valves, actuators, computers, and/or other devices that communicates with and controls the functionalities of the one or more ECUs 110. The vehicle control system 108 may include or may be coupled to the one or more ECUs 110. The ECUs 110 may control one or more of the electrical systems and subsystems of vehicle 104 and may control one or more functionalities of vehicle 104. The one or more ECUs 110 may include but are not limited to an airbag control unit, a body control module, a convenience control module, a door control unit, an engine control unit, an ignition control unit, an electric power steering control unit, a man-machine interface, a powertrain control module, a seat control unit, a speed control unit, a telephone control unit, a transmission control unit, a brake control module, an audio system, and the like, or any suitable combination thereof.

In some aspects of the present disclosure, the computing device 100 may be associated with the vehicle 104 before the computing device 100 is allowed act as a smart vehicle key to the vehicle 104. Associating the computing device 100 with the vehicle 104 and may enable the vehicle 104 accept at least one signal sent by the computing device 100 to the vehicle 104 and to perform one or more functions based at least in part on the at least one signal. In some examples, associating the computing device 100 with the vehicle 104 may include sending, by the computing device 100, an association request to the vehicle 104, including sending a device identifier associated with the computing device 100. The association request may be sent via the short-range communication module 102 included in the computing device 100 to the one or more short-range communication devices 106 included in the vehicle 104. In some examples, associating the computing device 100 with the vehicle 104 may not include sending a device identifier associated with the computing device 100 to the vehicle 104. Rather, other identifiers, such as an identifier identifying a user profile, a certificate, or any other identifier may be sent to the vehicle 104, and the vehicle 104 may be associated with the user profile, certificate, or any other identifier so that a user of the user profile, certificate, or any other identifier may use any computing device that is logged into or otherwise authorized to access the user profile, certificate, or any other identifier to access the vehicle 104.

In response to receiving the association request from the computing device 100, the vehicle 104 may send a response to the computing device 100. In some examples, the response may include an indication of whether the computing device 100 has successfully been associated with the vehicle 104. In some examples, the response indicating a successful association may include an access code such as a secret identifier, authentication key, a one-time password, a secure certificate, and the like, which may be used to provide encrypted communication, such as via public key encryption, between the computing device 100 and the vehicle 104. The access code may be generated by the vehicle 104 based at least in part on the device identifier associated with and sent by the computing device 100. In one example, the device identifier may be a unique identifier identifying the short range communication module 102. The device identifier may be used along with a unique identifier identifying one of the one or more short range communication devices 106 to generate an access code that is unique to the short-range communication module 102 and the one of the one or more short range communication devices 106. After receiving the vehicle identifier including the access code from the vehicle 104, the computing device 100 may store the access code in its memory (e.g., in a secure form) and may thereafter send the access code as part of its communications with the vehicle 104 to indicate that the computing device 100 is authorized to communicate with the vehicle 104. In some examples, the computing device 100 receives access code from a server, e.g., a server managed by the vehicle manufacturer or distributor, or may be generated by or received from any other sources. In some examples, the access code may be associated with a user profile that is authorized to access vehicle 104.

One or more example requirements may be imposed on the association process between the computing device 100 and the vehicle 104 to better secure the association process. For example, the vehicle 104 may be required to be running during the association process with the computing device 100 to successfully associate the computing device 100 with the vehicle 104. In another example, the computing device 100 may be required to be inside the passenger compartment of the vehicle 104 when associating with the vehicle 104 to successfully associate the computing device 100 with the vehicle 104. Such an example requirement may be implemented by requiring that communications during the association process between the computing device 100 and the vehicle 104 take place only between the short-range communication module 102 and a device within the one or more devices 106 that has a communications range that does not extend outside of the passenger compartment of the vehicle 104, thereby ensuring that the computing device 100 is inside the passenger compartment of the vehicle 104.

In some other examples, the computing device 100 may be associated with the vehicle 104 remotely, such as via a third-party server system (e.g., the cloud). For example, the computing device 100 may be determined by the third-party server system as being associated with an authorized user profile or account that is recognized by the third-party server system. The third-party server system may communicate with vehicle 104, such as via the Internet, to add the user profile as an authorized user of vehicle 104. Subsequently, the computing device 100 may be able to communicate with the vehicle 104, such as via NFC, to communicate information regarding the user profile associated with computing device 100 to the vehicle 104, and, after the vehicle 104 recognizes the user profile as an authorized user profile for vehicle 104, may recognize the computing device 100 as an authorized device and may allow the computing device 100 to control one or more functionalities of the vehicle 104.

In other examples, the computer device 100 and the vehicle 104 may be configured for authentication using a one-time-password. One-time passwords can be generated, e.g., based on time synchronization, an algorithm dependent on a previous password (e.g., a chain), and an algorithm based on an input. Examples of standards for one-time passwords may include: RFC 1760(S/KEY), RFC 2289 (OTP), and RFC 4226 (HOTP).

In some aspects of the present disclosure, after the computing device 100 is associated with the vehicle 104, the computing device 100 may be able to send to the vehicle 104 one or more control signals that control one or more functionalities of the vehicle 104. The one or more control signals may be transmitted from the short-range communication module 102 of the computing device 100 to one or more short-range communication devices 106 of the vehicle 104, and the one or more short-range communication devices 106 may communicate with the vehicle control system 108 based on the one or more control signals. The vehicle control system 108 may, based on the communications with the one or more short-range communication devices 106, control the one or more ECUs 110 to control one or more functionalities of the vehicle 104 as specified by the computing device 100.

Examples of functionalities of the vehicle 104 that may be controlled via one or more control signals may include but are not limited to audio functionalities of an audio system, seat position, temperature control functionalities of a body control unit, transmission functionalities of a transmission control unit, the steering functionalities of an electric power steering control unit, or the throttle and brake functionalities of a powertrain control module. Some examples of the audio functionalities of the audio system may include changing the volume of the audio system, changing the current radio station, or skipping a track of a CD being played by the audio station. Based on the one or more control signals, the vehicle control system 108 may communicate with the audio system within the one or more ECUs 110 to control its audio functionalities.

In addition, the control signals can be used to identify that an authorized driver is within the vehicle, and parameters (such as the driver's seat and climate control preferences) can be set based on the identity of the authorized driver. In some examples, personalized parameters for the user of the computing device 100, including seat positions, climate control preferences, audio system preferences, mirror positioning, and the like, may be stored in the computing device 100. After the computing device 100 communicates with the vehicle 104, the personal parameters for the user of the computing device 100 may be transmitted to the vehicle 104 and, in response to receiving the personal parameters, the vehicle 104 may adjust the vehicle 104's parameters based on the received personal parameters.

The computing device 100 may, in some examples, receive one or more control request signals from the remote computing device 114 via the network 112, and may generate one or more control signals based on the one or more control request signals received from the remote computing device 114 to control one or more functionalities of the vehicle 104. For example, the computing device 100 may receive one or more control request signals from the remote computing device 114 that includes a request to change the volume of the audio system of the vehicle 104. After receiving that request to change the volume included in the one or more control request signals, the computing device 100 may send to the vehicle 104 one or more control signals that controls the volume of the audio system of the vehicle 104.

In some aspects of the present disclosure, the vehicle 104 may send to the computing device 100 vehicle status data as the vehicle is under power. Examples of the vehicle status data may include any data associated with the vehicle 104, including but not limited to the velocity, engine speed, oil temperature, location data associated with the vehicle 14, current fuel economy, and the like. The vehicle status data may be produced by the one or more ECUs 110, may be collected by the vehicle control system 108, and may be sent by the one or more short-range communication devices 106 to the short-range communication module 102 of the computing device 100. In some examples, the vehicle 104 may send to the computing device 100 one or more other data. For example, the vehicle 104 may send one or more audio data to the computing device 100 that computing device 100 may output.

In some examples, the location data associated with the vehicle 104 may include GPS data. After receiving the location data from the vehicle 104, the computing device 100 may be able to use and manipulate the location data. For example, the computing device 100 may combine real-time traffic data with the location data to generate directional information from an origin to a destination based on the real-time traffic data and the location data. The computing device 100 may also transmit the location data associated with the vehicle 104, including sending the location data to a remote computing device, so that authorized remote systems and users may be provided with the location of the vehicle 104.

In some aspects of the present disclosure, the computing device 100 may be disassociated with the vehicle 104. The computing device 100 and the vehicle 104 may be disassociated by, for example, deleting the access code from the computing device 100 and/or the vehicle 104. The computing device 100, in some examples, may receive a disassociation signal from a remote computing device or from the vehicle 104, which may enable the computing device 100 to disassociate itself from the vehicle 104 by deleting the access code. The computing device 100, in some examples, may present an interface, such as a web-based interface, that is accessible from a remote computing device to disassociate the computing device 100 from the vehicle 104. Responsive to receiving the disassociation signal from the remote computing device or the vehicle 104, the computing device 100 may disassociate itself from vehicle 104 by deleting the access code from its memory.

Figure 2:
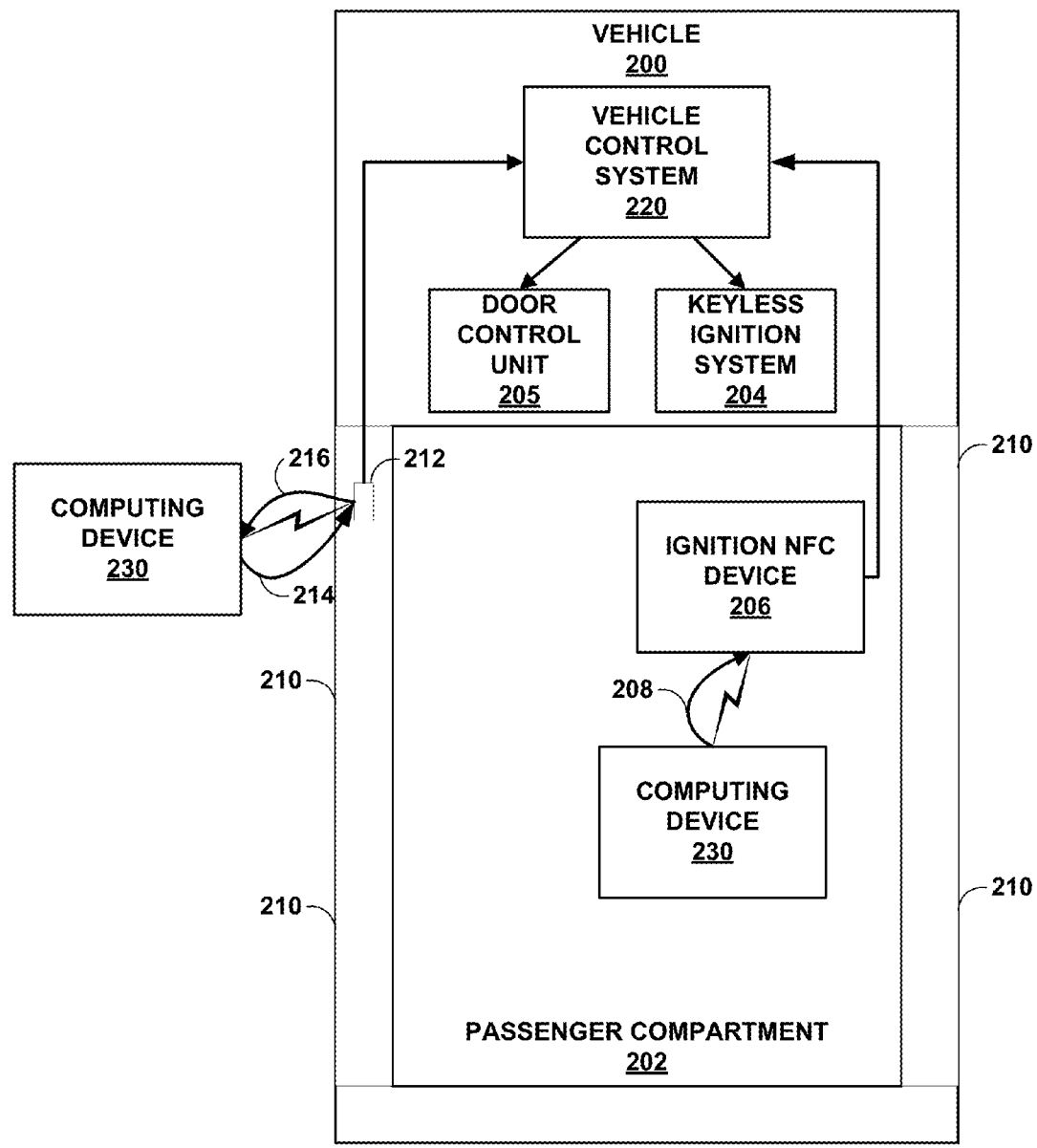
FIG. 2 is a block diagram illustrating an example computing device communicating with an example vehicle according to some aspects of the present disclosure.

FIG. 2 shows a block diagram illustrating an example computing device 230, such as the computing device 100 shown in FIG. 1, communicating with an example vehicle 200, such as the vehicle 104 shown in FIG. 1. As shown in FIG. 2, while the computing device 230 is associated with the vehicle 200, the computing device 230 may be used as a wireless smart vehicle key to unlock one or more doors 210 of the vehicle 200. The computing device 230 may be moved so that it is within communications range with the vehicle 200. For example, a user having the computing device 230 in his or her pocket may move in proximity to a door NFC device 212 so that the computing device 230 is within communications range, such as four centimeters, of the door NFC device 212.

After moving into communications range with the vehicle 200, the computing device 230 may send to the vehicle 200 via short-range communication at least one unlock door signal 214 including an identifier associated with the device identifier to enable the vehicle 200 to unlock one of the one or more doors 210 without further user intervention. The identifier included in the at least one unlock signal 214 may, in some examples, be the access code generated during association of the computing device 230 with the vehicle 200.

Moving the computing device 230 in range of the vehicle 200 may, in some examples, include moving the computing device 230 so that a short-range communication module (not shown) of the computing device 230 is within communication range of one of the one or more short-range communication devices (such as the one or more short range communication devices 106 of FIG. 1). After moving in communication range, the computing device 230 may communicate with the one or more short-range communication devices associated with a door of the vehicle 200, so that the at least one unlock door signal 214 enables the vehicle 200 to unlock the door associated with one of the one or more short-range communication devices without further user intervention.

For example, one of the one or more short-range communication devices may be a door NFC device 212 placed on one of the one or more doors 210 of the vehicle 200. A user may be able to unlock the one of the one or more doors 210 of the vehicle 200 by moving the computing device 230 within communications range of the door NFC device 212. When the computing device 230 is within communications range of the door NFC device 212, the door NFC device 212 may send a signal to a short-range communication module of the computing device 100 identifying itself as a short-range communication device that accepts at least one unlock door signal 214, and the short-range communication module of the computing device 230 may send an unlock door signal 214 to the door NFC device 212. In response, the door NFC device 212 may communicate with the vehicle control system 220 based at least in part on the unlock door signal 214, and the vehicle control system 220 may command a door control unit 205 to unlock the specified door associated with the door NFC device 212.

In some examples, after unlocking the specified door associated with the door NFC device 212, the vehicle 200 may transmit, via the door NFC device 212, data 216 to the computing device 230. The data 216, in some examples, may be diagnostic data associated with the vehicle 200, including but not limited to fuel levels, battery status, tire pressure, coolant levels, and the like, including a combination of two or more of these data. Diagnostic data associated with the vehicle 200 may be produced by one or more ECUs (such as the one or more ECUs 110 of FIG. 1), may be transmitted to the vehicle control system 220, and may be transmitted by the vehicle control system 220 to the door NFC device 212. The door NFC device 212 may communicate the diagnostic data to the computing device 230, and the computing device 230 may present the diagnostic data at a user interface to the user.

In some aspects of the present disclosure, the computing device 230 may also enable the vehicle 200 to lock one or more previously unlocked doors without further user intervention by being out of communications range of the vehicle 200 for a threshold amount of time. For example, if the vehicle 200 is stationary, if the vehicle 200 is not running, and if none of the short-range communication devices associated with the vehicle 200 can detect the computing device 230 for the threshold amount of time, the vehicle 200 may assume that the user of the computing device 230 has left the vehicle 200 and thus may lock one or more unlocked doors 210. In some examples, the threshold amount of time may be five seconds, ten seconds, or twenty seconds. Waiting for the threshold amount of time before locking the one or more unlocked doors 210 may prevent the vehicle 200 from locking its doors if the computing device 230 briefly loses contact with one or more short-range communication devices associated with the vehicle 200.

In some aspects of the present disclosure, after being associated with the vehicle 200, the computing device 230 may be used as a wireless vehicle key to activate the ignition of the vehicle 200, and to activate a previously deactivated keyless ignition system 204 of the vehicle 200, so that the vehicle 200 may be started without requiring a key to be inserted into the ignition of the vehicle 200. Examples of a keyless ignition system 204 may include a push button start system where a user may start the vehicle 200 by pushing a start button. The computing device 230 may send to the vehicle 200 via short-range communication at least one ignition signal 208 including an identifier associated with the device identifier to cause the vehicle 200 to activate a previously deactivated keyless ignition system 204 without further user intervention. The identifier included in the at least one ignition signal 208 may, in some examples, be the access code generated during association of the computing device 230 with the vehicle 200.

In some examples, after unlocking one or more of the doors 210 of the vehicle 200, the keyless ignition system 204 may be activated for a specified time period (e.g., 30 seconds, 60 seconds, 90 seconds) after one or more of the doors 210 are unlocked, and the keyless ignition system 204 may be deactivated after the specified time period passes.

Sending the at least one ignition signal from the computing device 230 may include sending the at least one ignition signal 208 from a short-range communication module of the computing device 230 to one of the one or more short-range communication devices, such as an ignition NFC device 206, located within a passenger compartment 202 of the vehicle 200 where the ignition NFC device 206 has a communications range that does not extend outside of the passenger compartment 202 of the vehicle 200. In that way, the keyless ignition system 204 of the vehicle 200 may only be activated if the computing device 230 is detected as being inside the passenger compartment 202 of the vehicle 200.

For example, the ignition NFC device 206 may, in some examples, be located near the ignition of the vehicle 200, or may, in some examples, be located near the driver's seat of the vehicle 200. After the user unlocks one or more of the doors 210 of the vehicle 200 and enters the passenger compartment 202 of the vehicle 200, the computing device 230 may come into communications range of the ignition NFC device 206. The ignition NFC device 206, in some examples, may send a signal to the short-range communication module of the computing device 230 identifying itself as a short-range communication device that accepts at least one ignition signal 208, and the short-range communication module of the computing device 230 may send at least one ignition signal 208 to the ignition NFC device 206. After receiving the at least one ignition signal 208 from the computing device 230, the ignition NFC device 206 may communicate with the vehicle control system.

Figure 3:
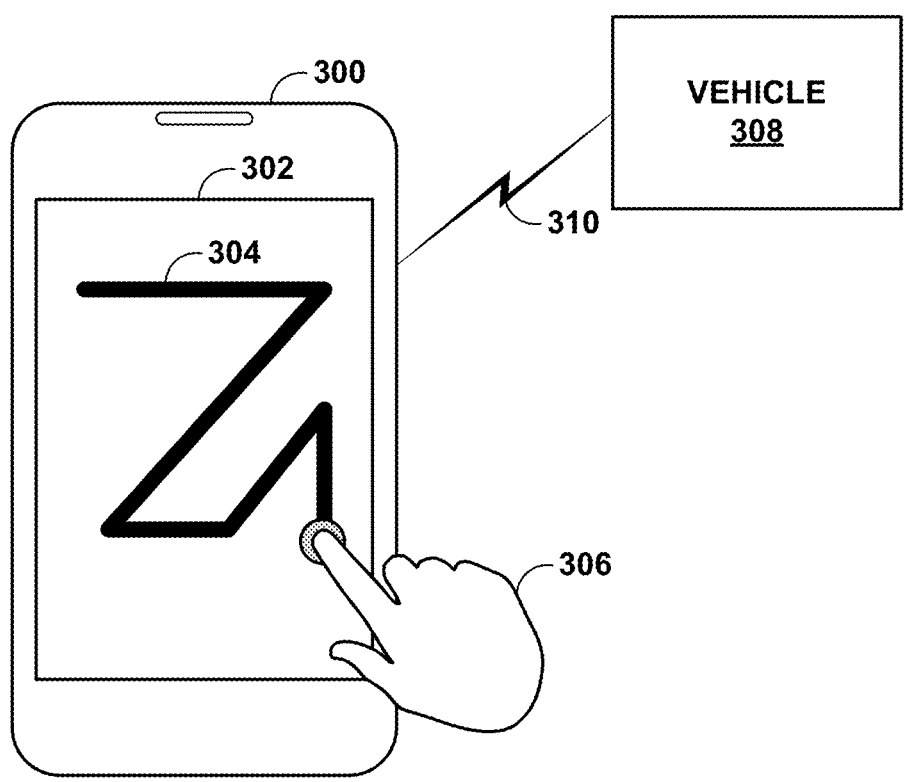
FIG. 3 is a conceptual diagram illustrating an example computing device communicating with an example vehicle according to some aspects of the present disclosure.

FIG. 3 shows a conceptual diagram of an example computing device 300, such as the computing device 100 of FIG. 1 in communications with an example vehicle 308, such as the vehicle 104 of FIG. 1. As shown in FIG. 3, the computing device 300 may include a user interface 302, such as the user interface 103 of FIG. 1. The user interface 302, in some examples, may be a touch-sensitive display that a user 306 may interact with by contacting. The computing device 300 may provide additional security measures to prevent unauthorized users from sending at least one signal 310 from the computing device 300 to the vehicle 308. In some examples, the computing device 300 may authenticate the user 306 to authorize the computing device 300 to send the at least one signal 310 to the vehicle 308. The authorization of the user 306 may take place in response to the computing device 300 initially communicates with the vehicle 308, such as when the computing device 300 moves within the communications range of the vehicle 308. In some examples, the authorization of the user 306 may occur upon the user 306 launching a vehicle key-related application on the computing device 300. Authenticating the user 306 may include prompting the user 306 for a pass code, such as via the user interface 302, receiving a pass code from the user 306, such as via the user interface 302, and determining, based on the pass code, whether the send the at least one signal 310 to the vehicle 308.

Authenticating the user 306 may also include presenting an authentication interface on the user interface 302 of the computing device 300. Unlike a conventional smartphone lock screen interface, the authentication interface may not allow the computing device 300 to transition from a user interface lock state to a user interface unlock state. Rather, the authentication interface may allow the computing device 300 to transition from a first state where it is unauthorized to send the at least one signal 310 to the vehicle 308 to a second state where it is authorized to send the at least one signal 310 to the vehicle 308. For example, the computing device 300 may detect contact by the user 306 with the user interface 302, the contact corresponding with a gesture 304, and may determine, based on the gesture 304, whether to send the at least one signal 310 to the vehicle 308. For example, the user 306 may have setup the computing device 300 to accept a specific gesture 304, anyone using the computing device 300 may have to replicate that gesture 304, such as by contacting the user interface 302, to transition the computing device 300 to the second state where it is authorized to send the at least one signal 310 to the vehicle 308. In some examples, the computing device 300 being unauthorized to send the at least one signal 310 to the vehicle 308 may include the computing device 300 not sending any signal to the vehicle 308, or may include the computing device 300 sending a signal to the vehicle 308 that does not include the access code shared between the computing device 300 and the vehicle 308.

In some examples, the user 306 may be authenticated via biometrics, such as via thumbprint recognition, voice recognition, facial recognition, and any other biometric identification techniques. For example, computing device 300 may be able to capture images of facial features, voice samples, or a thumbprint from the user 306, and may determine whether the computing device 300 is allowed to transition from the first state where it is unauthorized to send the at least one signal 310 to the vehicle 308 to the second state where it is authorized to send the at least one signal 310 to the vehicle 308 based at least in part on the captured biometrics information.

In some other examples, the user 306 may input a personal identification number or a pass phrase in order to authenticate the user 306 and to cause computing device 300 to transition from the first state where it is unauthorized to send the at least one signal 310 to the vehicle 308 to the second state where it is authorized to send the at least one signal 310 to the vehicle 308.

Figure 4:
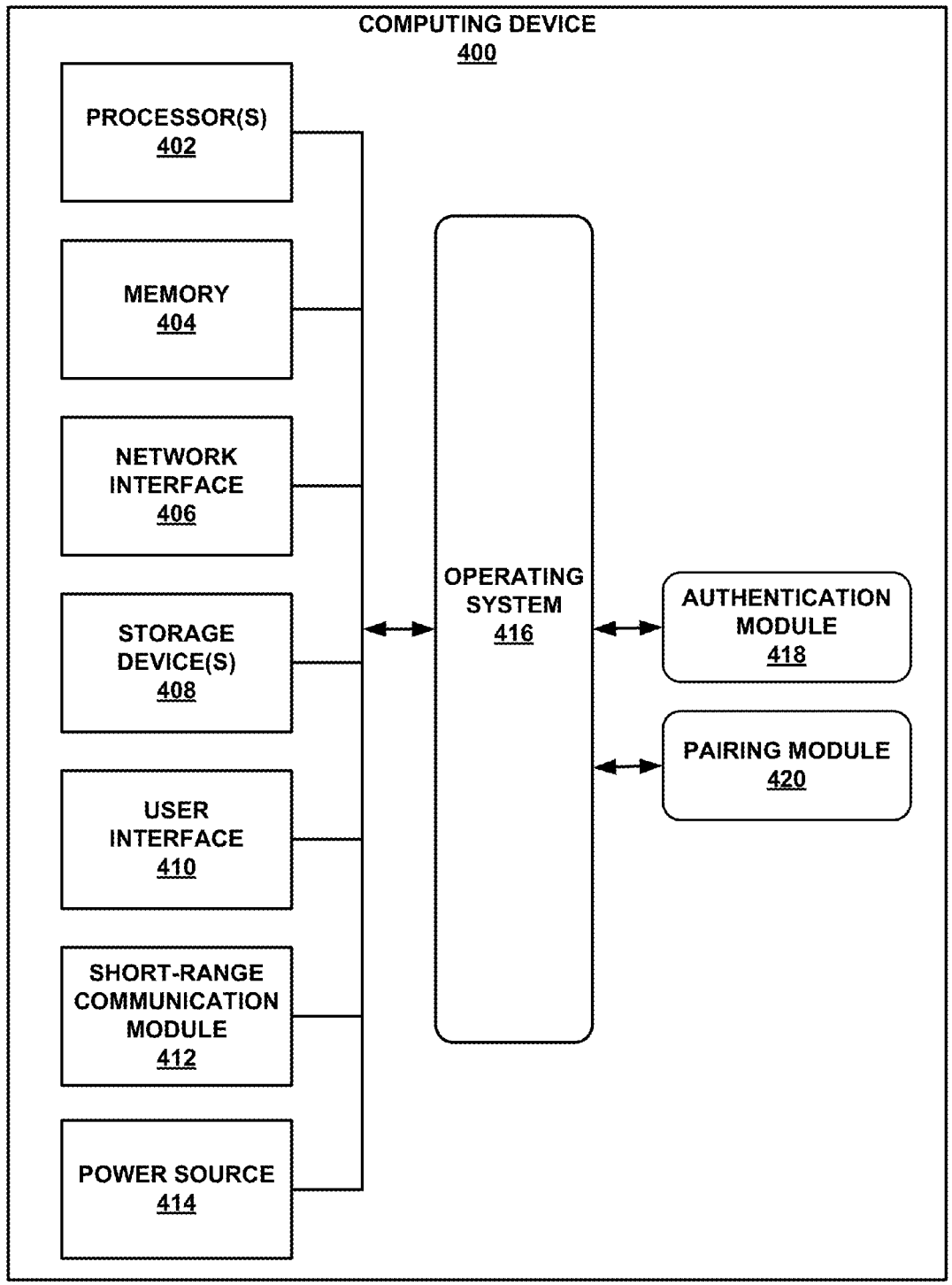
FIG. 4 is a block diagram illustrating an example computing device according to some aspects of the present disclosure.

FIG. 4 is a block diagram illustrating components of an example computing device 400, such as the computing device 100, the remote computing device 114, and the vehicle control system 108 shown in FIG. 1, and the computing device 200 shown in FIG. 2. FIG. 4 illustrates only one particular example of the computing device 400, and many other examples of the computing device 400 may be used in other instances.

As shown in the specific example of FIG. 4, the computing device 400 may include one or more processors 402, a memory 404, a network interface 406, one or more storage devices 408, a user interface 410, a short-range communication module 412, and a power source 414. The computing device 400 may also include an operating system 416, which may include modules and/or applications that are executable by the one or more processors 402 and the computing device 400. The computing device 400, in one example, may also include an authentication module 418 and a pairing module 420, both of which may be executable by the one or more processors 402 of the computing device 400. Each of the components 402, 404, 406, 408, 410, 412, 414, 416, 418, and 420 may be interconnected (physically, communicatively, and/or operatively) for inter-component communications.

The one or more processors 402, in one example, may be configured to implement functionality and/or process instructions for execution within the computing device 400. For example, the one or more processors 402 may be capable of processing instructions stored in the memory 404 or instructions stored on the one or more storage devices 408. These instructions may define or otherwise control the operation of the operating system 416, the authentication module 418, and the pairing module 420.

The memory 404 may, in one example, be configured to store information within the computing device 400 during operation. The memory 404, in some examples, may be described as a computer-readable storage medium. In some examples, the memory 404 may be a temporary memory, meaning that a primary purpose of the memory 404 is not long-term storage. The memory 404 may, in some examples, be described as a volatile memory, meaning that the memory 404 does not maintain stored contents when the computing device 400 is turned off. Examples of volatile memories may include random access memories (RAM), dynamic random access memories (DRAM), static random access memories (SRAM), and other forms of volatile memories known in the art. In some examples, the memory 404 may be used to store program instructions for execution by the one or more processors 402. The memory 404 may, in one example, be used by software or applications running on the computing device 400 (e.g., the authentication module 418 and the pairing module 420) to temporarily store information during program execution.

The one or more storage devices 408 may, in some examples, also include one or more computer-readable storage media. The one or more storage devices 408 may be configured to store larger amounts of information than the memory 404. The one or more storage devices 408 may further be configured for long-term storage of information. In some examples, the one or more storage devices may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

The computing device 400 may, in some examples, also include the network interface 406. The computing device 400 may, in one example, use the network interface 406 to communicate with external devices (such as the remote computing device 114 of FIG. 1) via one or more networks (such as the network 112 of FIG. 1). The network interface 406 may be a network interface card, such as an Ethernet card, an optical transceiver, a radio frequency transceiver, or any other type of device that can send and receive information. Other examples of such network interfaces may include Bluetooth, 3G and Wi-Fi radios in mobile computing devices as well as USB. In some examples, the computing device 400 may use the network interface 406 to wirelessly communicate with an external device such as a server, mobile phone, or other networked computing device.

The computing device 400 may, in one example, also include the user interface 410, such as the user interface 103 of FIG. 1. The user interface 410 may be configured to receive input from a user (e.g., tactile, audio, or video feedback). The user interface 410 may include a touch-sensitive and/or a presence-sensitive screen or display, mouse, a keyboard, a voice responsive system, or any other type of device for detecting a command from a user. In some examples, the user interface 410 may include a touch-sensitive screen, mouse, keyboard, microphone, or camera.

The user interface 410 may also include, combined or separate from input devices, output devices. In this manner, the user interface 410 may be configured to provide output to a user using tactile, audio, or video stimuli. In one example, the user interface 410 may include a touch-sensitive screen or display, sound card, a video graphics adapter card, or any other type of device for converting a signal into an appropriate form understandable to humans or machines. In addition, the user interface 410 may include a speaker, a cathode ray tube (CRT) monitor, a liquid crystal display (LCD), or any other type of device that can generate intelligible output to a user.

The computing device 400, in some examples, may include a power source 414, which may be a rechargeable battery and may provide power to the computing device 400. The power source 414 may, in some examples, be a battery made from nickel-cadmium, lithium-ion, or other suitable material. In other examples, the power source 414 may be a power source capable of providing stored power or voltage from another power source.

In addition, the computing device 400 may include the short-range communication module 412, such as the short-range communication module 102 or the one or more short-range communication devices 106 of FIG. 1. As described herein, the short-range communication module 412 may be active hardware that is configured to communicate with other short-range communication devices. In general, the short-range communication module 412 may be configured to communicate wirelessly with other devices in physical proximity to short-range communication module 412 (e.g., less than approximately ten centimeters, or less than approximately four centimeters). In other examples, the short-range communication module 412 may be replaced with an alternative short-range communication device configured to communicate with and receive data from other short-range communication devices. These alternative short-range communication devices may operate according to Bluetooth, Ultra-Wideband radio, or other similar protocols. In some examples, the short-range communication module 412 may be an external hardware module that is coupled with computing device 400 via a bus (such as via a Universal Serial Bus (USB) port). The short-range communication module 412, in some examples, may also include software which may, in some examples, be independent from the operating system 416, and which may, in some other examples, be a sub-routine of the operating system 416.

The computing device 400 may also include the operating system 416. The operating system 416 may, in some examples, control the operation of components of the computing device 400. For example, the operating system 416 may, in one example, facilitate the interaction of the authentication module 418 and the pairing module 420 with the one or more processors 402, the memory 404, the network interface 406, the one or more storage devices 408, the user interface 410, the short-range communication module 412, and the power source 414.

The authentication module 418 may be an application being executed on the one or more processors 402 that may be configured to authenticate a user of the computing device 400 and to authorize the short-range communication module 412 to send at least one signal to a vehicle (such as the vehicle 104 of FIG. 1) based at least in part on successful authentication of the user. In some examples, the authentication module 418 may prompt the user for a pass code via the user interface 410 as the computing device 400 moves in range of one or more short-range communication devices (such as the one or more short-range communication devices 106 of FIG. 1) of the vehicle. The user may input a pass code, such as an alphanumeric string, into the computing device 400 via the user interface 410, and the authentication module 418 may receive the pass code from the user. After successful authenticating the user, the authentication module 418 may send at least one signal to a vehicle based at least in part on successful authentication of the user.

In some examples, the authentication module 418 may present an authentication interface on the user interface 410, such as a touch-sensitive display, of the computing device 400. Contact by the user with the touch-sensitive display may be detected, the contact corresponding to a gesture. The authentication module 418 may determine, based on the gesture, whether to send at least one signal to the vehicle.

The pairing module 420 may be an application being executed on the one or more processors 402 that may be configured to associate the computing device 400 with a vehicle (such as the vehicle 104 of FIG. 1) via short-range communication.

Any applications (e.g., the authentication module 418 and the pairing module 420) implemented within or executed by the computing device 400 may be implemented or contained within, operable by, executed by, and/or be operatively/communicatively coupled to components of the computing device 400 (e.g., the one or more processors 402, the memory 404, the network interface 406, the one or more storage devices 408, the user interface 410, the short-range communication module 412, and/or the power source 414).

Figure 5:
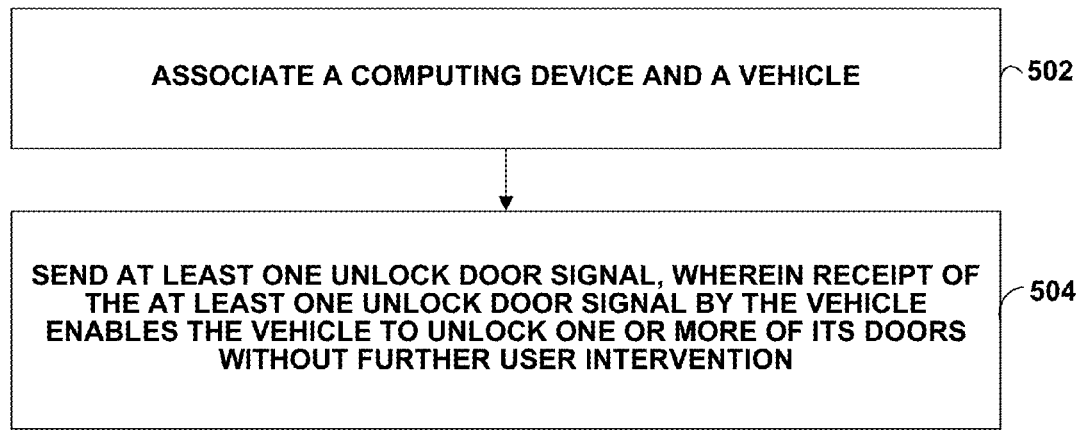
FIG. 5 is a flowchart illustrating an example method of using a computing device as a vehicle key for a vehicle according to some aspects of the present disclosure.

FIG. 5 is a flowchart illustrating an example method of using a computing device, such as the computing device 100 of FIG. 1, as a smart vehicle key for a vehicle, such as the vehicle 104 of FIG. 1. The method may include associating a computing device and a vehicle including sending, by the computing device, an identifier associated with the computing device to the vehicle via short-range communication (502). The method may further include sending, from the computing device to the vehicle via short-range communication, at least one unlock door signal including an access code that is verifiable by the vehicle, and wherein receipt of the at least one unlock door signal by the vehicle enables the vehicle to unlock one or more of its doors without further user intervention (504). In some examples, short-range communication may include near field communication.

The method may further include sending, from the computing device to the vehicle via short-range communication, at least one ignition signal that includes an access code that is verifiable by the vehicle, and wherein receipt of the at least one ignition signal by the vehicle enables the vehicle to activate a keyless ignition system of the vehicle. In some examples, sending the at least one ignition signal may further include sending, from the computing device to a short-range communication device associated with the vehicle via short-range communication, the at least one ignition signal, wherein the short-range communication device is located within a passenger compartment of the vehicle, and wherein the short-range communication device has a communications range that does not extend outside of the passenger compartment.

In some examples, associating the computing device may further include communicating, by the computing device with a short-range communication device associated with the vehicle via short-range communication, wherein the short-range communication device is located within a passenger compartment of the vehicle, and wherein the short-range communication device has a communications range that does not extend outside of the passenger compartment. In some examples, associating the computing device may further include successfully associating the computing device and the vehicle only while an engine powering the vehicle is running.

The method may further include authenticating a user to authorize the computing device to send at least one signal to the vehicle. Authenticating the user may further include receiving a pass code from the user and determining, based on a verification of the pass code, whether to send the at least one signal to the vehicle. Authenticating the user may further include presenting an authentication interface on a touch-sensitive display of the computing device, detecting contact by the user with the touch-sensitive display of the computing device, the contact corresponding with a gesture, and determining, based on the gesture, whether to send the at least one signal to the vehicle.

The method may further include presenting, by the computing device, an interface accessible from a remote computing device to disassociate the computing device and the vehicle.

The method may further include receiving, by the computing device from the vehicle via short-range communication, a disassociation signal, and, responsive to receiving the disassociation signal, disassociating the computing device from the vehicle.

The method may further include receiving, by the computing device from the vehicle via short-range communication, diagnostic data associated with the vehicle, and outputting, by the computing device, the diagnostic data.

Sending the at least one unlock door signal may further include sending, from the computing device to an short-range communication device associated with a door of the vehicle via short-range communication, the at least one signal that includes the identifier, and wherein receipt of the at least one signal by the short-range communication device enables the vehicle to unlock the door associated with the short-range communication device without further user intervention. In some examples, the short-range communication device may have a communications range that is less than about ten centimeters.

The method may further include enabling the vehicle to lock one or more unlocked doors without further user intervention by being outside of communications range of the vehicle for a threshold amount of time.

The method may further include sending, from the computing device to the vehicle via short-range communication, one or more control signals that control one or more functionalities of the vehicle. In some examples, the one or more control signals may control one or more functionalities of an audio system of the vehicle. The method may further include receiving, by the computing device, one or more control request signals from a remote computing device, and generating the one or more control signals based on the one or more control request signals received from the remote computing device. In some examples, the identifier may include information regarding a user profile associated with the computing device, and the access code may be associated with the user profile.

Figure 6:
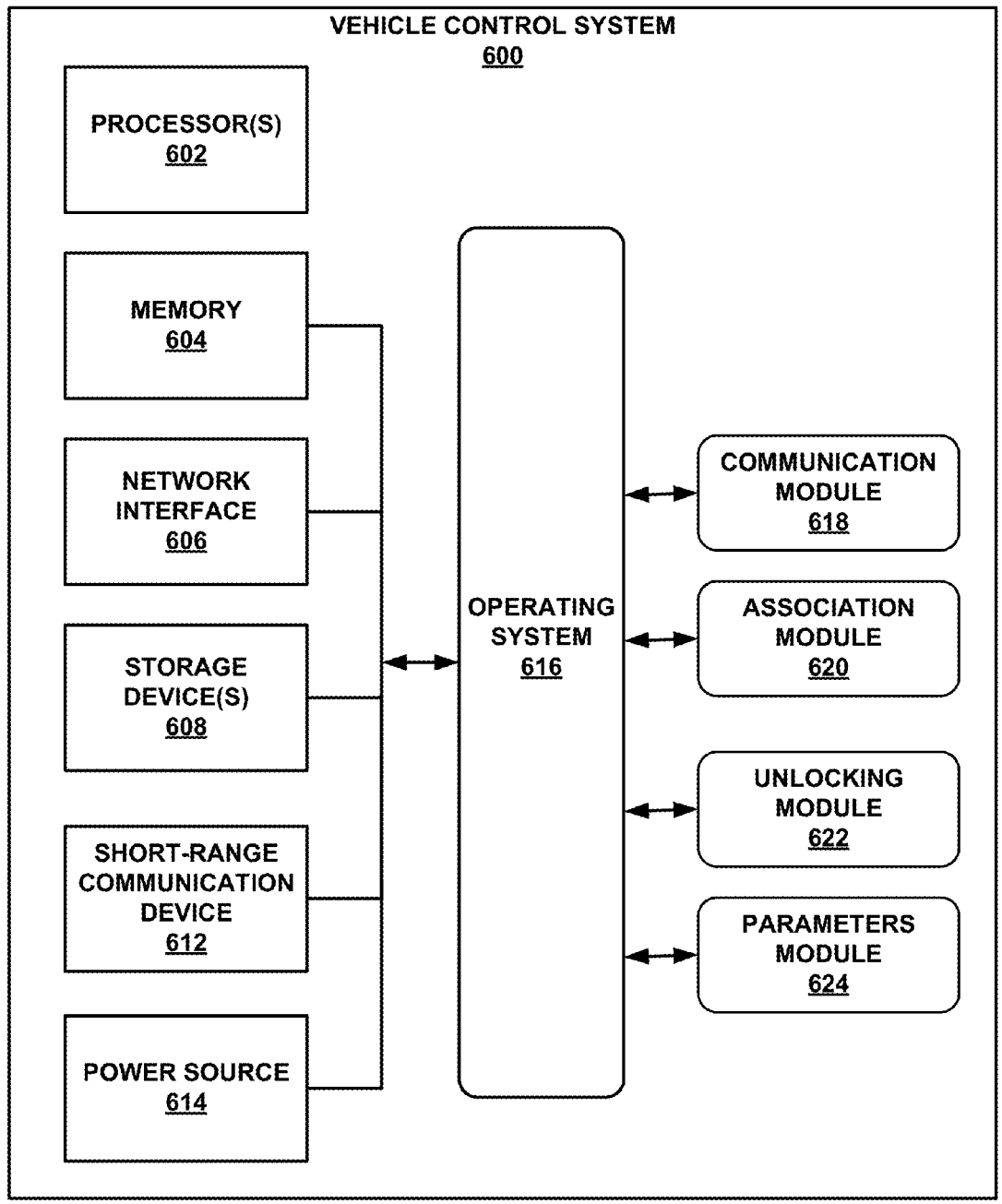
FIG. 6 is a block diagram illustrating an example vehicle control system according to some aspects of the present disclosure.

FIG. 6 is a block diagram illustrating components of an example vehicle control system 600, such as the vehicle control system 108 shown in FIG. 1, and the computing vehicle control system 220 shown in FIG. 2. FIG. 6 illustrates only one particular example of the vehicle control system 600, and many other examples of the vehicle control system 600 may be used in other instances.

As shown in the specific example of FIG. 6, the vehicle control system 600 may include one or more processors 602, a memory 604, a network interface 606, one or more storage devices 608, a short range communication device 612, and a power source 614. The vehicle control system 600 may also include an operating system 616, which may include modules and/or applications that are executable by the one or more processors 602 and the vehicle control system 600. The vehicle control system 600, in one example, may also include a communication module 618, an association module 620, an unlocking module 622, and a parameters module, all of which may be executable by the one or more processors 602 of the vehicle control system 600. Each of the components 602, 604, 606, 608, 612, 614, 616, 618, 620, 622, and 624 may be interconnected (physically, communicatively, and/or operatively) for inter-component communications.

The one or more processors 602, in one example, may be configured to implement functionality and/or process instructions for execution within the vehicle control system 600. For example, the one or more processors 602 may be capable of processing instructions stored in the memory 604 or instructions stored on the one or more storage devices 608. These instructions may define or otherwise control the operation of the operating system 616, the communication module 618, the association module 620, the unlocking module 622, and the parameters module 624.

The memory 604 may, in one example, be configured to store information within the vehicle control system 600 during operation. The memory 604, in some examples, may be described as a computer-readable storage medium. In some examples, the memory 604 may be a temporary memory, meaning that a primary purpose of the memory 604 is not long-term storage. The memory 604 may, in some examples, be described as a volatile memory, meaning that the memory 604 does not maintain stored contents when the vehicle control system 600 is turned off. Examples of volatile memories may include random access memories (RAM), dynamic random access memories (DRAM), static random access memories (SRAM), and other forms of volatile memories known in the art. In some examples, the memory 604 may be used to store program instructions for execution by the one or more processors 602. The memory 604 may, in one example, be used by software or applications running on the computing device 600 (e.g., the communication module 618, the association module 620, the unlocking module 622, and the parameters module 624) to temporarily store information during program execution.

The one or more storage devices 608 may, in some examples, also include one or more computer-readable storage media. The one or more storage devices 608 may be configured to store larger amounts of information than the memory 604. The one or more storage devices 608 may further be configured for long-term storage of information. In some examples, the one or more storage devices may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories.

The vehicle control system 600 may, in some examples, also include the network interface 606. The vehicle control system 606 may, in one example, use the network interface 606 to communicate with external devices (such as a third party remote server system) via one or more networks (such as the Internet). The network interface 606 may be a network interface card, such as an Ethernet card, an optical transceiver, a radio frequency transceiver, or any other type of device that can send and receive information. Other examples of such network interfaces may include Bluetooth, 3G and Wi-Fi radios in mobile computing devices as well as USB. In some examples, the vehicle control system 600 may use the network interface 606 to wirelessly communicate with an external device such as a server, mobile phone, or other networked computing device.

The vehicle control system 600, in some examples, may include a power source 614, which may be a rechargeable battery and may provide power to the computing device 600. The power source 614 may, in some examples, be a battery made from nickel-cadmium, lithium-ion, or other suitable material. In other examples, the power source 614 may be a power source capable of providing stored power or voltage from another power source.

In addition, the vehicle control system 612 may include a short range communication device 612. In some examples, the short range communication device 612 may operate according to NFC, Bluetooth, Ultra-Wideband radio, or other similar protocols.

The vehicle control system 600 may also include the operating system 616. The operating system 616 may, in some examples, control the operation of components of the vehicle control system 600. For example, the operating system 616 may, in one example, facilitate the interaction of the communication module 618, the association module 620, the unlocking module 622, and the parameters module 624 with the one or more processors 602, the memory 604, the network interface 606, the one or more storage devices 608, the short-range communication device 612, and the power source 614.

The communication module 618 may be an application being executed on the one or more processors 602 and may be configured to communicate with a mobile computing device, such as via short-range communications (e.g., NFC, Bluetooth, etc.), receive an identifier associated with the mobile computing device, and receive at least one unlocking signal from the mobile computing device. The at least one unlocking signal may include an access code that is verifiable by the vehicle control system 600. In some examples, the communication module 618 may be configured to receive information regarding a user profile from a remote server system.

In some examples, the communication module 618 may be configured to send vehicle status data to the mobile computing device. In some examples, the communication module 618 may be configured to send location data of the vehicle including the vehicle control system 600 to the mobile computing device. In some examples, the communication module 618 may be configured to send audio data to the mobile computing device. In some examples, the communication module 618 may be configured to receive one or more personal parameters from the mobile computing device. In some examples, The association module 620 may be an application being executed on the one or more processors 602 and may be configured to, after the communication module 618 receives the identifier associated with the mobile computing device, associate the computing device with the vehicle that includes the vehicle control system 600. In some examples, the association module 620 may be configured to associated the user profile received from the remote server system with the vehicle including the vehicle control system 600, so that a mobile computing device associated with the user profile may be used to access the vehicle.

The unlocking module 622 may be an application being executed on the one or more processors 602 and may be configured to, after the communication module 618 receives at least one unlocking signal from the mobile computing device, direct an electronic control unit of the vehicle that includes the vehicle control system 600 to unlock one or more doors of the vehicle. In some examples, the unlocking module 622 may be further configured to, after the communication module 618 receives the at least one unlocking signal from the mobile computing device, direct a second electronic control unit to activate a keyless ignition system of the vehicle that includes the vehicle control system 600. In some examples, the unlocking module 622 may be further configured to direct the second electronic control unit to deactivate the keyless ignition system of the vehicle after a specified time period.

The parameters module 624 may be an application being executed on the one or more processors 602 and may be configured to adjust one or more parameters of the vehicle including the vehicle control system 600 based on the one or more personal parameters received by the communication module 618.

Any applications (e.g., the communication module 618, association module 620, unlocking module 622, and parameters module 624) implemented within or executed by the vehicle control system 600 may be implemented or contained within, operable by, executed by, and/or be operatively/communicatively coupled to components of the vehicle control system 600 (e.g., the one or more processors 602, the memory 604, the network interface 606, the one or more storage devices 608, the short-range communication device 612, and/or the power source 614).

Figure 7:
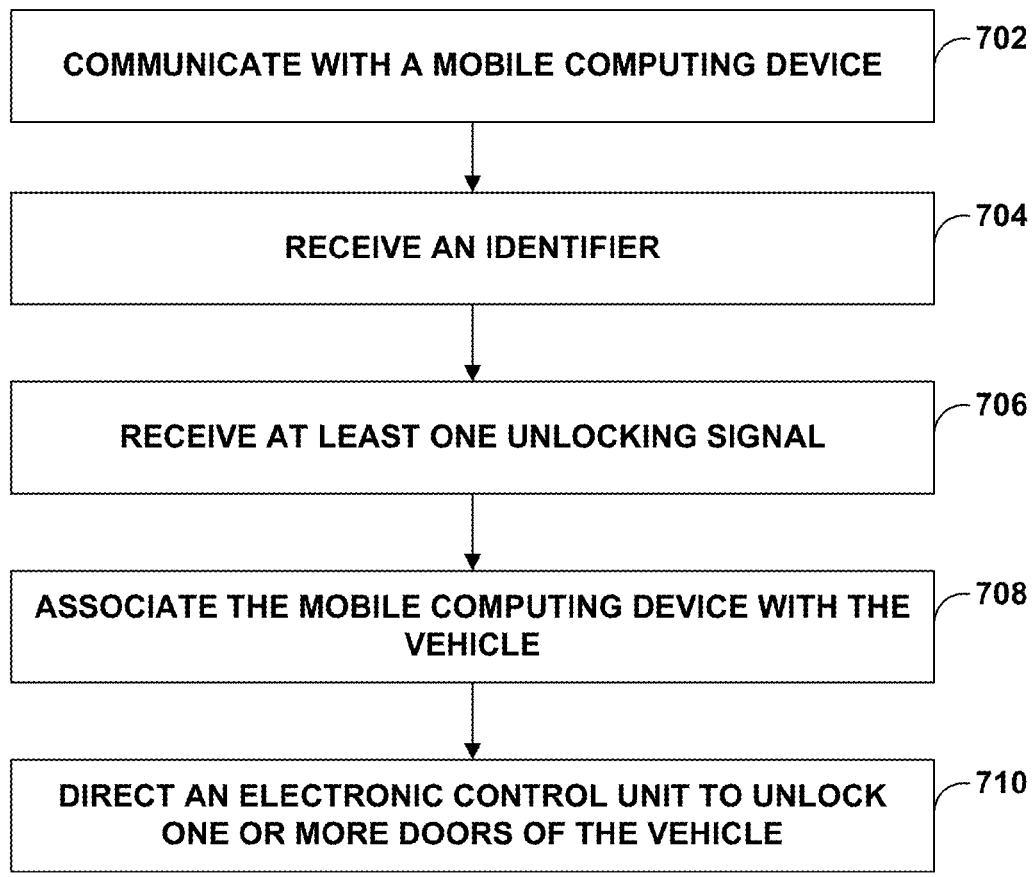
FIG. 7 is a flowchart illustrating an example method of using a computing device as a vehicle key for a vehicle according to some aspects of the present disclosure.

FIG. 7 is a flowchart illustrating an example method of using a computing device, such as the computing device 100 of FIG. 1, as a smart vehicle key for a vehicle, such as the vehicle 104 of FIG. 1. The method may include communicating, by a vehicle control system of a vehicle, with a mobile computing device (702). The method may further include receiving, by the vehicle control system, an identifier associated with a mobile computing device (704). The method may further include receiving, by the vehicle control system, at least one unlocking signal from the mobile computing device, the at least one unlocking signal including an access code that is verifiable by the vehicle control system (706). The method may further include, after receiving the identifier associated with the mobile computing device, associating, by the vehicle control system, the mobile computing device with the vehicle (708). The method may further include, after receiving at least one unlocking signal from the mobile computing device, directing, by the vehicle control system, an electronic control unit to unlock one or more doors of the vehicle (710).

In some examples, the method may further include, after receiving the at least one unlocking signal from the mobile computing device, directing, by the vehicle control system, a second electronic control unit to activate a keyless ignition system of the vehicle. In some examples, the method may further include directing, by the vehicle control system, the second electronic control unit to deactivate the keyless ignition system of the vehicle after a specified time period.

In some example, the method may include receiving, by the vehicle control system, information regarding a user profile from a remote server system and associating, by the vehicle control system, the user profile with the vehicle. In some examples, the method may include sending, by the vehicle control system, vehicle status data to the mobile computing device. In some examples, the method may include sending, by the vehicle control system, location data to the mobile computing device. In some examples, the method may include sending, by the vehicle control system, audio data to the mobile computing device. In some examples, the method may include receiving, by the vehicle control system, one or more control signals from the mobile computing device. In some examples, the method may include receiving, by the vehicle control system, one or more personal parameters from the mobile computing device. In some examples, the method may include adjusting, by the vehicle control system, one or more parameters of the vehicle based on the one or more personal parameters.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media.

In some examples, a computer-readable storage medium may comprise non-transitory medium. The term "non-transitory" may indicate that the storage medium is not embodied in a carrier wave or a propagated signal. In certain examples, a non-transitory storage medium may store data that can, over time, change (e.g., in RAM or cache).

Various embodiments of the invention have been described. These and other embodiments are within the scope of the following claims.

The invention claimed is:
1. A method comprising:
receiving, by at least one processor of a vehicle, a request from a computing device to authorize the computing device to act as a vehicle key for the vehicle, including receiving an identifier associated with the computing device;
in response to determining that the computing device is authorized to act as the vehicle key for the vehicle, generating, by the at least one processor, an access code based at least in part on the identifier;
sending, by the at least one processor to the computing device, an indication that the computing device is authorized to act as the vehicle key for the vehicle, wherein the indication includes the access code; and
in response to receiving at least one unlocking signal that includes the access code from the computing device, directing, by the at least one processor, an electronic control unit to unlock one or more doors of the vehicle without further user intervention.
2. The method of claim 1, further comprising:
in response to receiving the at least one unlocking signal from the computing device, directing, by the at least one processor, the electronic control unit to activate a keyless ignition system of the vehicle.

3. The method of claim 2, further comprising:
directing, by the at least one processor, the electronic control unit to deactivate the keyless ignition system of the vehicle in response to a specified time period having elapsed.

4. The method of claim 1, further comprising:
receiving, by the at least one processor, one or more personal parameters from the computing device; and
adjusting, by the at least one processor via the electronic control unit, one or more parameters of the vehicle based at least in part on the one or more personal parameters.

5. The method of claim 1, further comprising:
sending, by the at least one processor, vehicle status data to the computing device.

6. A non-transitory computer-readable storage medium containing instructions that, when executed on at least one programmable processor of a vehicle, cause the at least one programmable processor to perform operations comprising:
receiving a request from a computing device to authorize the computing device to act as a vehicle key for the vehicle, including receiving an identifier associated with the computing device;
in response to determining that the computing device is authorized to act as the vehicle key for the vehicle, generating an access code based at least in part on the identifier;
sending, to the computing device, an indication that the computing device is authorized to act as the vehicle key for the vehicle, wherein the indication includes the access code; and
in response to receiving at least one unlocking signal that includes the access code from the computing device, directing an electronic control unit to unlock one or more doors of the vehicle without further user intervention.

7. The non-transitory computer-readable storage medium of claim 6, wherein the operations further comprise:
in response to receiving the at least one unlocking signal from the computing device, directing the electronic control unit to activate a keyless ignition system of the vehicle.

8. The non-transitory computer-readable storage medium of claim 7, wherein the operations further comprise:
directing the electronic control unit to deactivate the keyless ignition system of the vehicle in response to a specified time period having elapsed.

9. The non-transitory computer-readable storage medium of claim 6, wherein the operations further comprise:
receiving or more personal parameters from the computing device; and
adjusting, via the electronic control unit, one or more parameters of the vehicle based at least in part on the one or more personal parameters.

10. The non-transitory computer-readable storage medium of claim 6, wherein the operations further comprise:
sending vehicle status data to the computing device.

11. A vehicle control system for a vehicle, the vehicle control system comprising:
one or more processors configured to:
receive a request from a computing device to authorize the computing device to act as a vehicle key for the vehicle, including receiving an identifier associated with the computing device;
in response to determining that the computing device is authorized to act as the vehicle key for the vehicle, generate an access code based at least in part on the identifier;
send, to the computing device, an indication that the computing device is authorized to act as the vehicle key for the vehicle, wherein the indication includes the access code; and
in response to receiving at least one unlocking signal that includes the access code from the computing device, direct an electronic control unit to unlock one or more doors of the vehicle without further user intervention.

12. The vehicle control system of claim 11, wherein the one or more processors are further configured to, in response to receiving the at least one unlocking signal from the computing device, direct the electronic control unit to activate a keyless ignition system of the vehicle.

13. The vehicle control system of claim 12 wherein the one or more processors are further configured to direct the electronic control unit to deactivate the keyless ignition system of the vehicle in response to a specified time period having elapsed.

14. The vehicle control system of claim 11, wherein the one or more processors are further configured to:
receive information regarding a user profile from a remote server system; and
associate the user profile with the vehicle.

15. The vehicle control system of claim 11, wherein the one or more processors are further configured to send vehicle status data to the computing device.

16. The vehicle control system of claim 11, wherein the one or more processors are further configured to send location data to the computing device.

17. The vehicle control system of claim 11, wherein the one or more processors are further configured to send audio data to the computing device.

18. The vehicle control system of claim 11, wherein the one or more processors are further configured to receive one or more control signals from the computing device.

19. The vehicle control system of claim 11, wherein the one or more processors are further configured to receive one or more personal parameters from the computing device.

20. The vehicle control system of claim 19, wherein the one or more processors are further
configured to adjust one or more parameters of the vehicle based on the one or more personal parameters.

* * * * *